US011246126B2

(12) United States Patent
Khoshnevisan et al.

(10) Patent No.: US 11,246,126 B2
(45) Date of Patent: Feb. 8, 2022

(54) TRANSPORT BLOCK SIZE DETERMINATION FOR JOINT TRANSMISSION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/579,407

(22) Filed: Sep. 23, 2019

(65) Prior Publication Data
US 2020/0100224 A1 Mar. 26, 2020

Related U.S. Application Data

(60) Provisional application No. 62/735,453, filed on Sep. 24, 2018.

(51) Int. Cl.
H04W 72/04 (2009.01)
H04L 5/00 (2006.01)
H04W 24/08 (2009.01)
H04L 27/26 (2006.01)

(52) U.S. Cl.
CPC ......... *H04W 72/042* (2013.01); *H04L 5/0007* (2013.01); *H04L 27/2601* (2013.01); *H04W 24/08* (2013.01)

(58) Field of Classification Search
CPC .. H04W 72/042; H04W 24/08; H04L 5/0007; H04L 27/2601
See application file for complete search history.

(56) References Cited

U.S. PATENT DOCUMENTS

2011/0286398 A1* 11/2011 Chung .................... H04L 1/065 370/328
2012/0063400 A1 3/2012 Papasakellariou et al.
2015/0280871 A1 10/2015 Xu et al.
2015/0289237 A1* 10/2015 Kim ...................... H04L 5/0094 370/329

(Continued)

FOREIGN PATENT DOCUMENTS

WO 2016122756 A1 8/2016

OTHER PUBLICATIONS

Huawei, et al., "DL/UL Resource Allocation and TB Size Determination," 3GPP Draft, 3GPP TSG RAN WG1 Meeting #90bis, R1-1717078, 3rd Generation Partnership Project (3GPP), Mobile Competence Centre, 650, Route Des Lucioles, F-06921, Sophia-Antipolis Cedex, France, vol. RAN WG1. No. Prague, Czech Republic, Oct. 9, 2017-Oct. 13, 2017, Oct. 8, 2017 (Oct. 8, 2017), XP051340269, 13 pages, Retrieved from the Internet: URL: http://www.3gpp.org/ftp/Meetings_3GPP_SYNC/RAN1/Docs/ [retrieved on Oct. 8, 2017]table 1 sections 1. 2.2. 3.1. 3.2.

(Continued)

Primary Examiner — Elton Williams
(74) Attorney, Agent, or Firm — Patterson & Sheridan, LLP

(57) ABSTRACT

Aspects of the present disclosure relate to wireless communications, and more particularly, to techniques for determining transport block size (TBS) for joint transmissions involving multiple transmission reception points (TRPs).

24 Claims, 11 Drawing Sheets

(56) References Cited

U.S. PATENT DOCUMENTS

2016/0119948 A1 4/2016 Damnjanovic et al.
2018/0102890 A1 4/2018 Yi et al.

OTHER PUBLICATIONS

Intel Corporation: "NR UE Demodulation Performance Requirements", 3GPP Draft, 3GPP TSG-RAN WG4 Meeting #86bis, R4-1804156—NR UE Demod Requirements, 3rd Generation Partnership Project (3GPP), Mobile Competence Centre, 650, Route Des Lucioles, F-06921, Sophia-Antipolis Cedex, France, vol. RAN WG4. No. Melbourne, Australia, Apr. 16, 2018-Apr. 20, 2018, Apr. 15, 2018 (Apr. 15, 2018), XP051431057, pp. 1-6, Retrieved from the Internet: URL: http://www.3gpp.org/ftp/Meetings%5F3GPP%5FSYNC/RAN4/Docs/ [retrieved on Apr. 15, 2018] sections 1-4.
International Search Report and Written Opinion—PCT/US2019/052588—ISA/EPO—dated Apr. 8, 2020.
Partial International Search Report—PCT/US2019/052588—ISA/EPO—dated Dec. 16, 2019.
Samsung: "DL/UL Resource Allocation," 3GPP Draft, 3GPP TSG RAN WG1 Meeting 90bis, R1-1717662 Resource Allocation, 3rd Generation Partnership Project (3GPP), Mobile Competence Centre, 650, Route Des Lucioles, F-06921, Sophia-Antipolis Cedex, France, vol. RAN WG1. No. Praguem, CZ; Oct. 9, 2017-Oct. 13, 2017, Oct. 8, 2017 (Oct. 8, 2017), XP051340847, pp. 1-11, Retrieved from the Internet: URL: http://www.3gpp.org/ftp/Meetings_3GPP_SYNC/RAN1/Docs/ [retrieved on Oct. 8, 2017] sections 3. 4.

* cited by examiner

TRANSPORT BLOCK SIZE DETERMINATION FOR JOINT TRANSMISSION

CROSS-REFERENCE TO RELATED APPLICATIONS

This Patent Application claims priority to U.S. Provisional Patent Application No. 62/735,453 filed Sep. 24, 2018 assigned to the assignee hereof. The disclosure of the prior Application is considered part of and is incorporated by reference in this Patent Application.

FIELD OF THE DISCLOSURE

Aspects of the present disclosure relate to wireless communications, and more particularly, to techniques for determining a transport block size (TBS) for joint transmissions involving multiple resource sets in spatial domain, frequency domain, or time domain, where different resource sets have different TCI states.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a network entity. The method generally includes calculating a target code rate based on a set of transmission parameters for joint transmission of a transport block (TB) to a user equipment (UE) involving at least first and second resource sets and signaling, via downlink control information (DCI), the target code rate to the UE for use in calculating a transport block size (TBS) for processing the joint transmission.

Certain aspects provide a method for wireless communication by a user equipment (UE). The method generally includes receiving downlink control information (DCI) signaling of a target code rate calculated based on a set of transmission parameters used for joint transmission of a transport block (TB) to the UE involving at least first and second resource sets and calculating a transport block size (TBS) for processing the joint transmission based on the target code rate.

Aspects also include various apparatuses, means, and computer readable mediums having instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
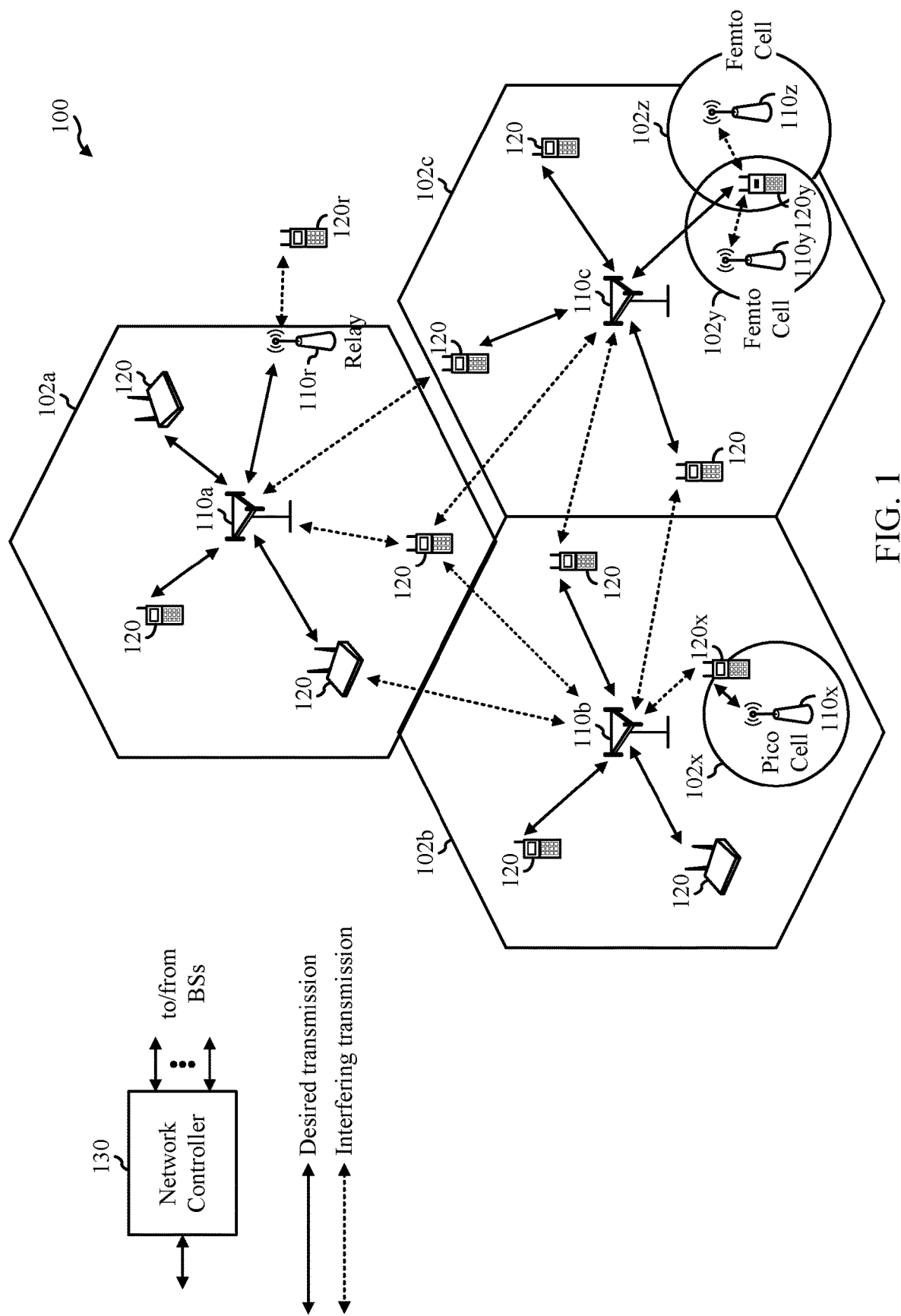
FIG. 1 is a block diagram conceptually illustrating an example telecommunications system, in accordance with certain aspects of the present disclosure.

Aspects of the present disclosure relate to wireless communications, and more particularly, to techniques for determining transport block size (TBS) for joint transmissions. The joint transmissions may involve multiple resource sets (e.g., layers (spatial domain), resource blocks (frequency domain), or OFDM symbols/slots (time domain)) associated with multiple Transmission Configuration Indicator (TCI) states. The multiple TCI states can be associated with multiple Base stations, TRPs, or Panels.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may include one or more base stations 110 that act as (or control) multiple transmitter reception points (TRPs) and configured to perform operations 1000 of FIG. 10 to perform joint transmissions to a UE 120 performing operations 1100 of FIG. 11.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
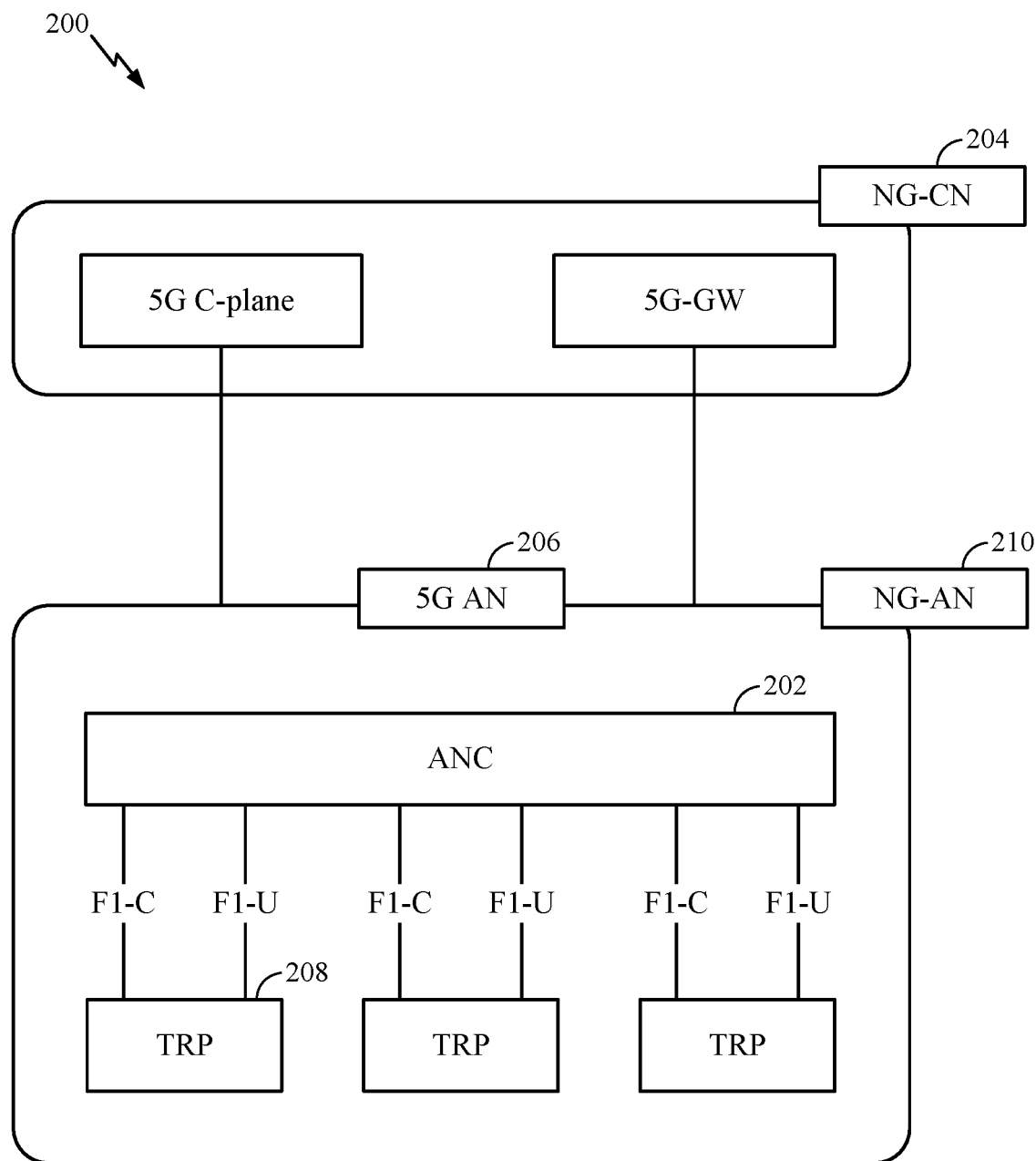
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
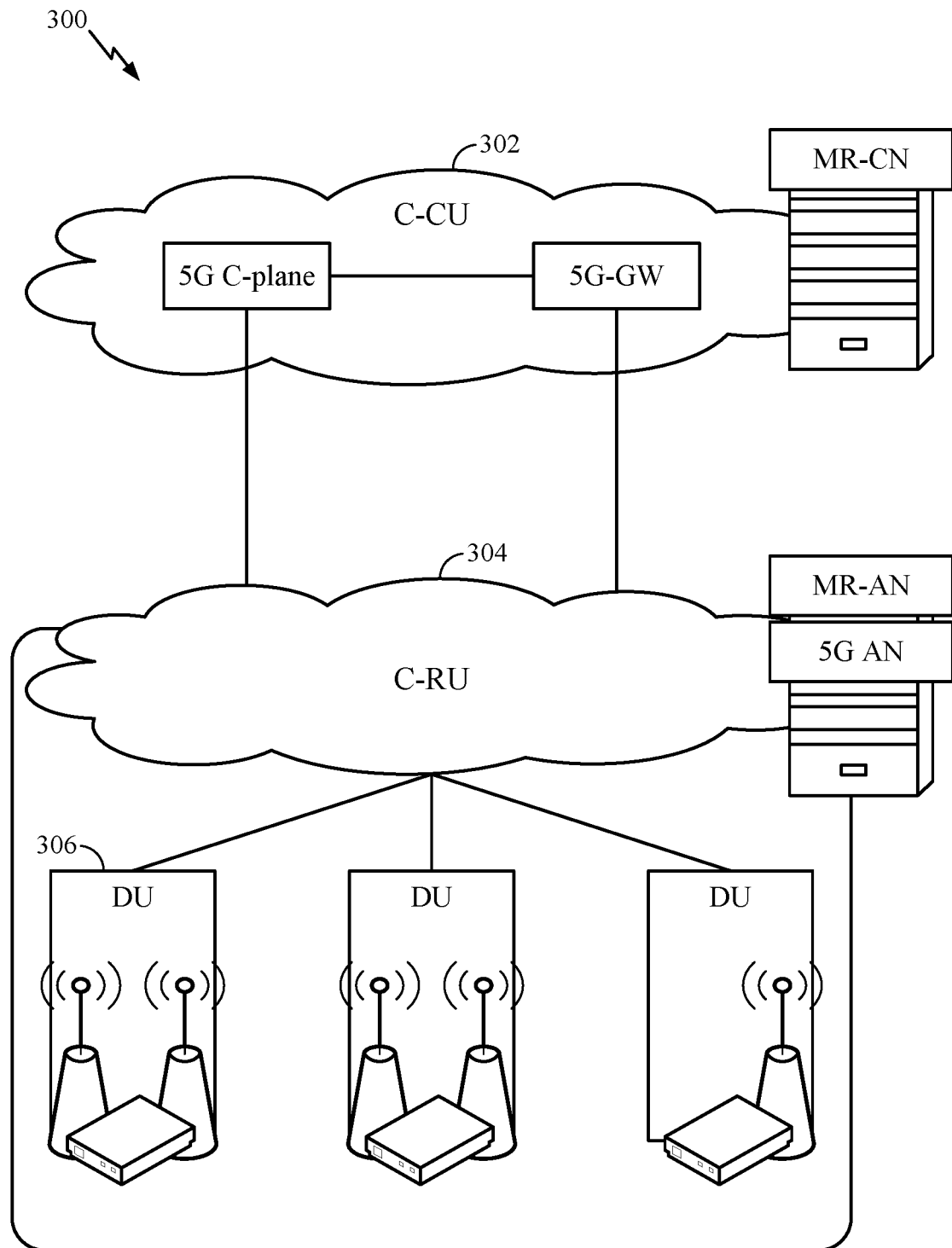
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
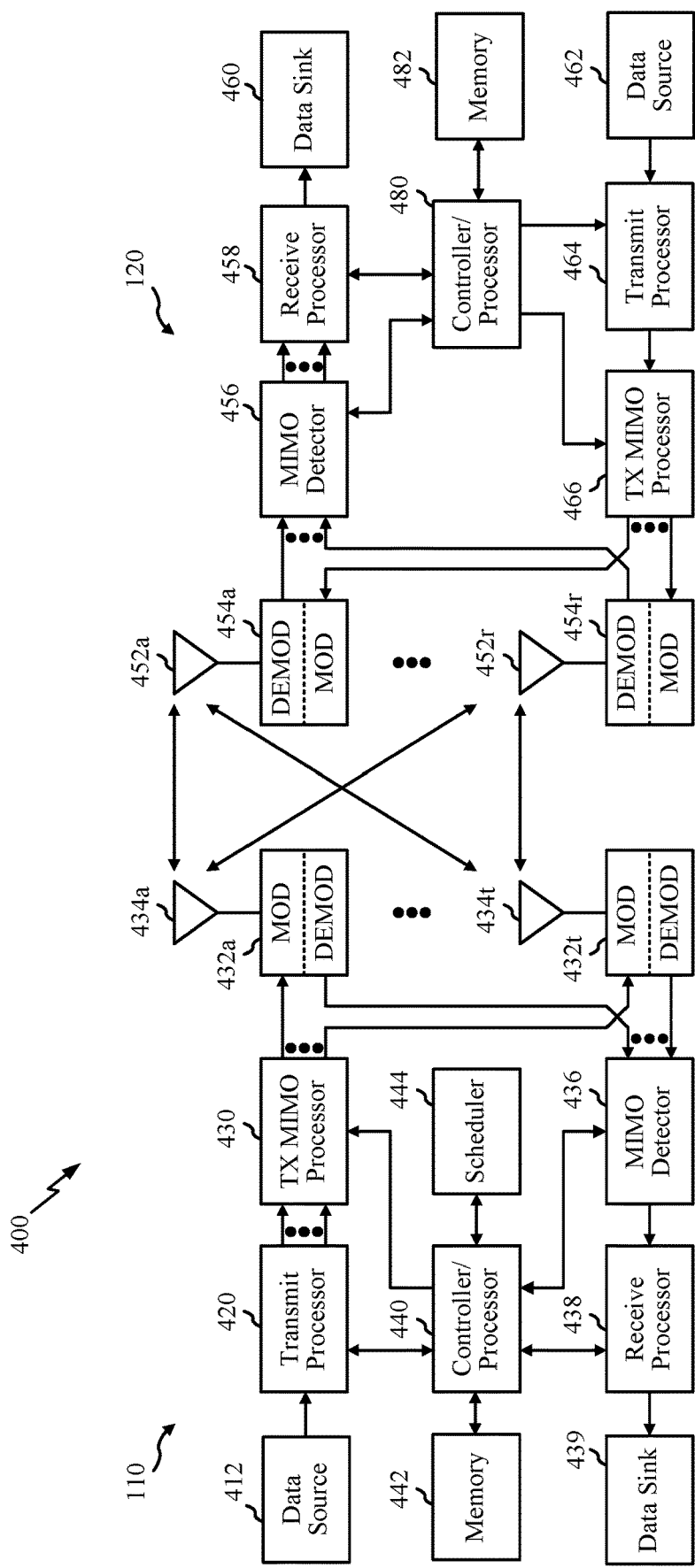
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

Figure 10:
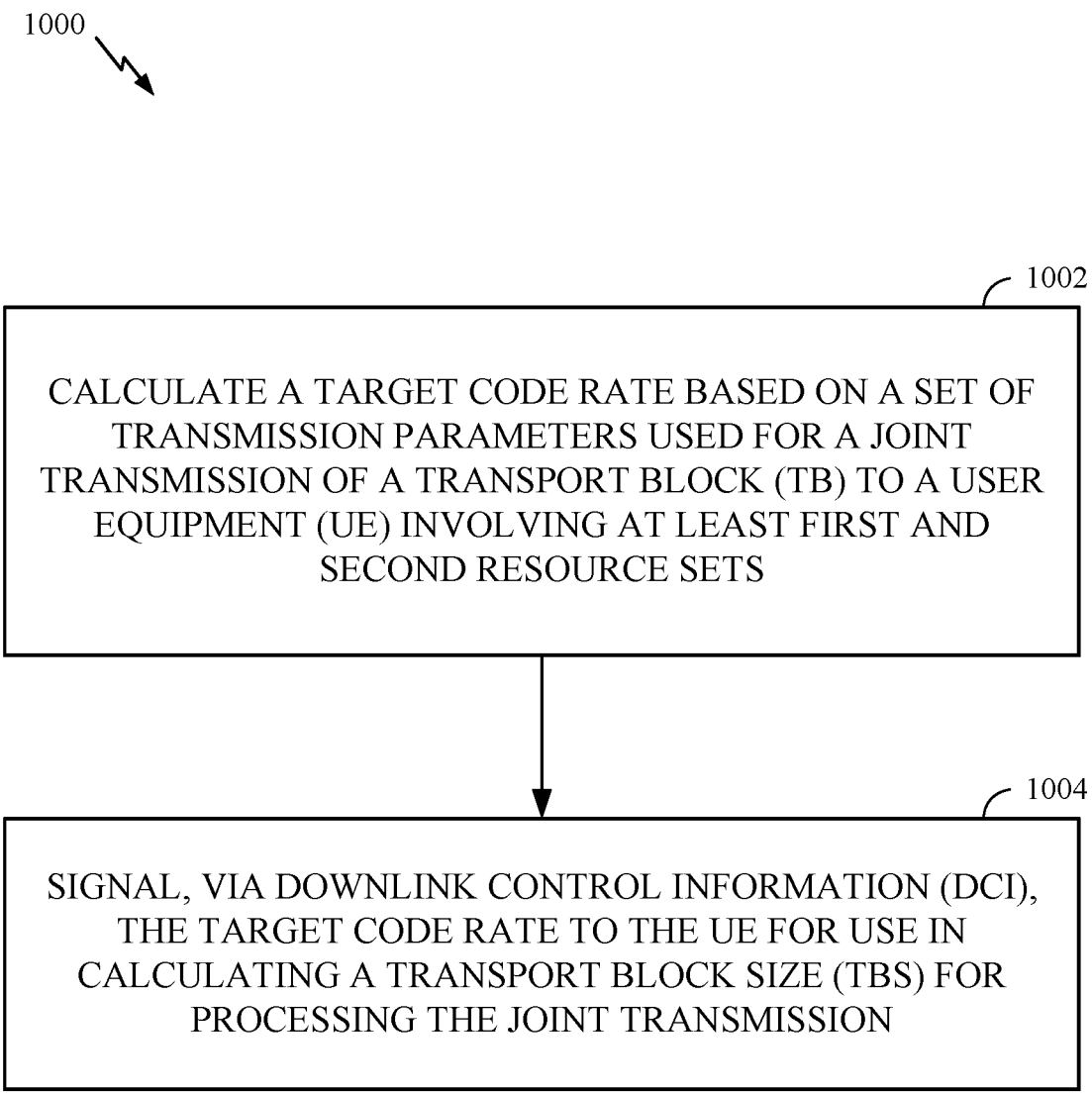
FIG. 10 is a flow diagram illustrating example operations that may be performed by a network entity, in accordance with certain aspects of the present disclosure.
Figure 11:
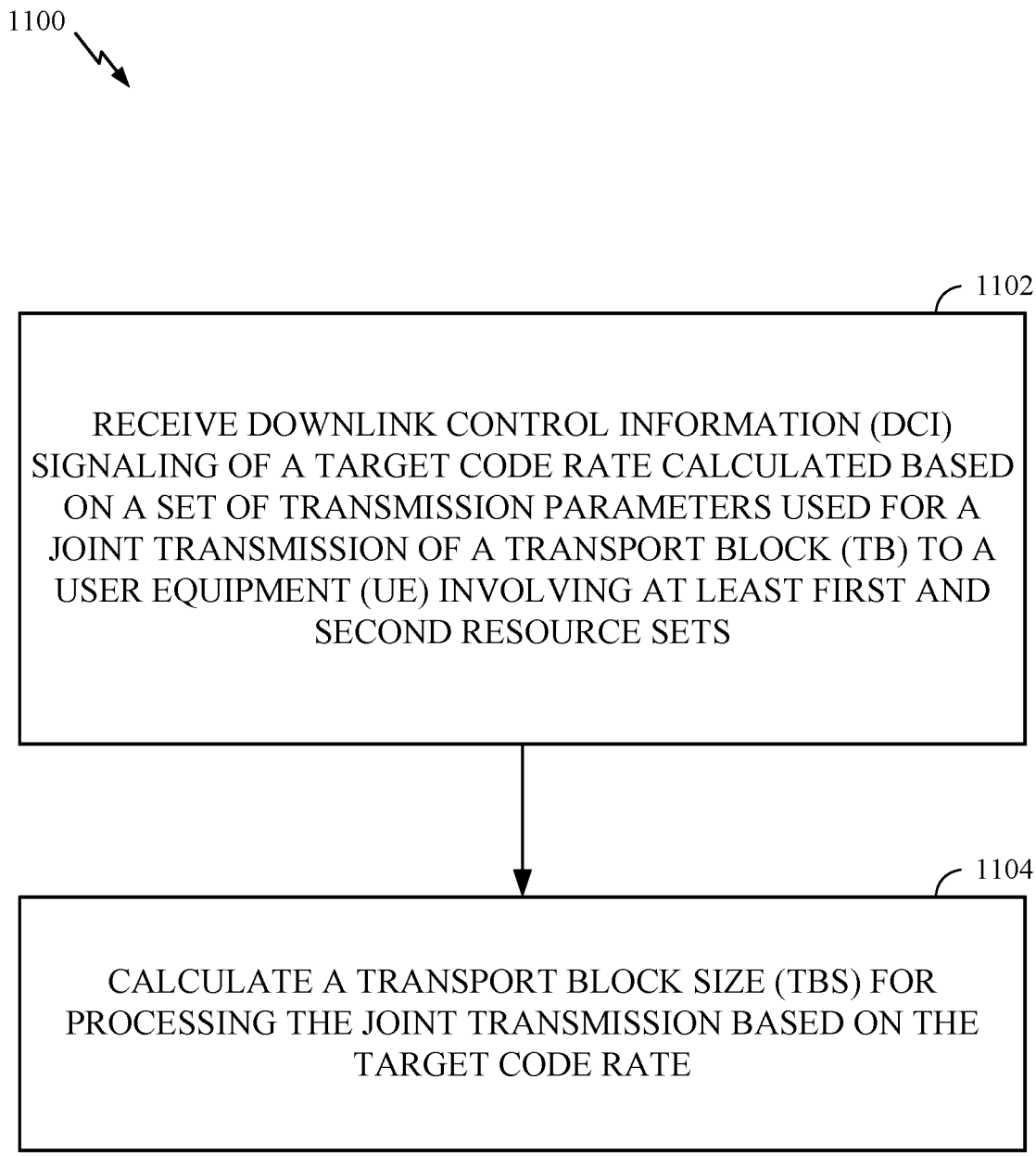
FIG. 11 is a flow diagram illustrating example operations that may be performed by a user equipment (UE), in accordance with certain aspects of the present disclosure.

The controllers/processors 440 and 480 may direct the operation at the BS 110 and the UE 120, respectively, to perform operations 1000 of FIG. 10 and operations 1100 of FIG. 11, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
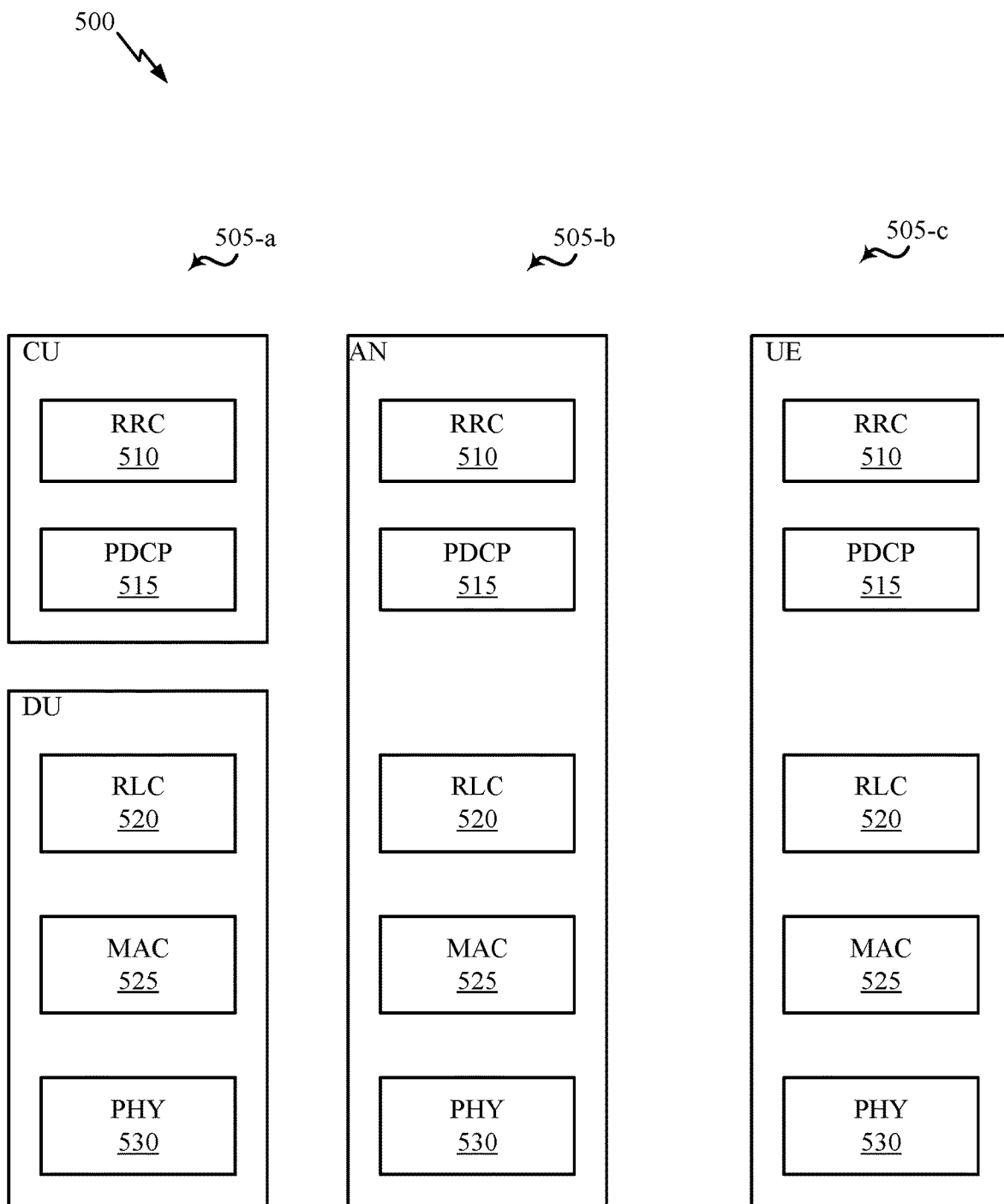
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
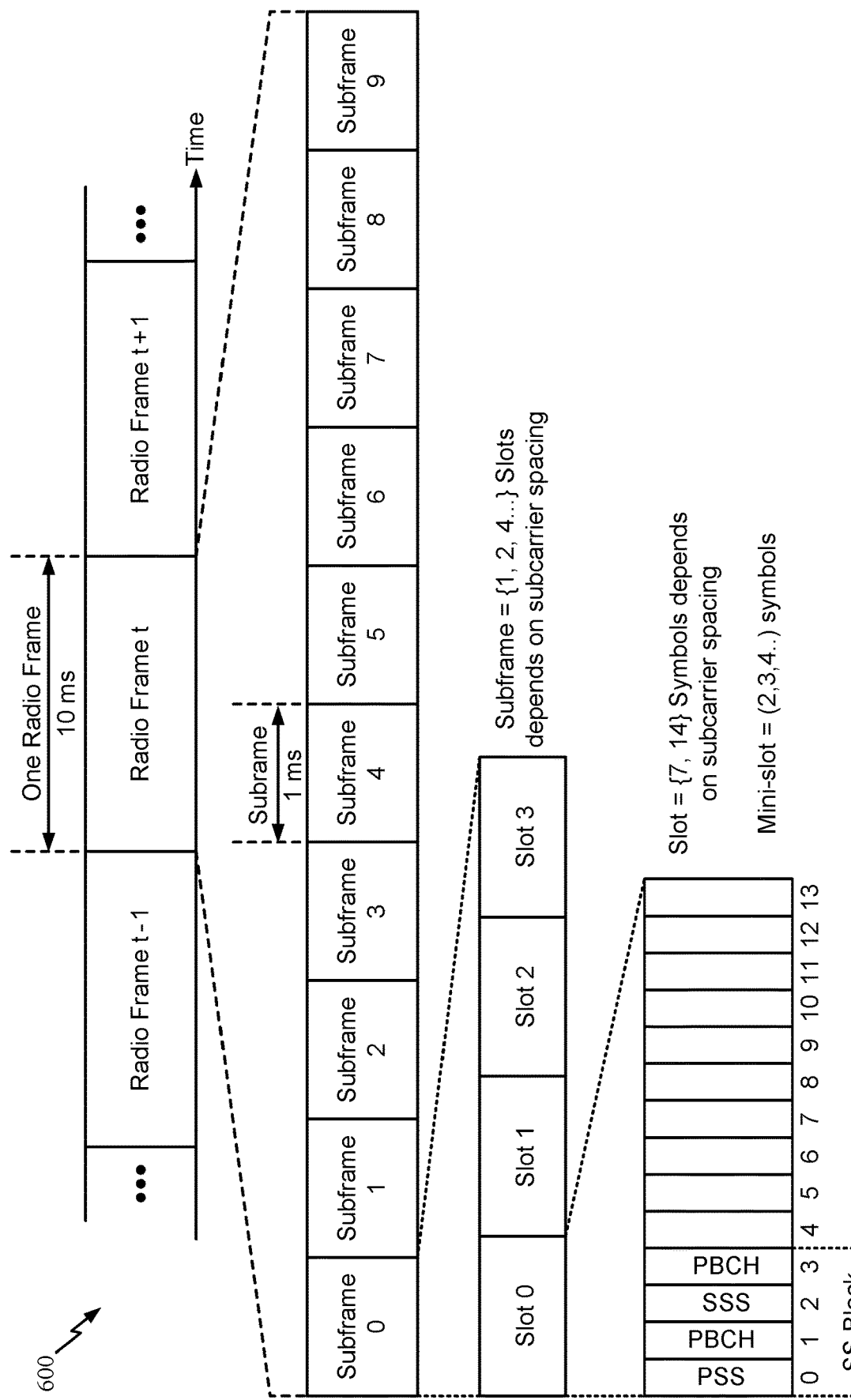
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, while the SS may provide the CP length and frame timing. The PSS and SSS may provide the cell identity. The PBCH carries some basic system information, such as downlink system bandwidth, timing information within radio frame, SS burst set periodicity, system frame number, and the like. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Certain systems perform encoding for some physical channels. For example, some systems perform low-density parity check (LDPC) encoding. LDPC involve encoding using a base graph with variable nodes corresponding systematic information bits and parity bits and associated check nodes. The encoding may involve lifting the base graph and interconnecting edges in the base graph using cyclic integer lifting values. The base graph is associated with a code rate, which is sometimes referred to as the mother code rate. For example, a first base graph (referred to as BG1, having N=3K) may have a ⅓ rate and a second base graph (referred to as BG2, having N=5K) may be a ⅕ rate. Rate matching may be performed to achieve different code rates, for example, based on available transmission resources at the transmitting device. Puncturing may be performed to drop one or more information bits. Rate matching includes bit selection and interleaving. In some examples, polar coding or other coding the may be used.

Figure 7:
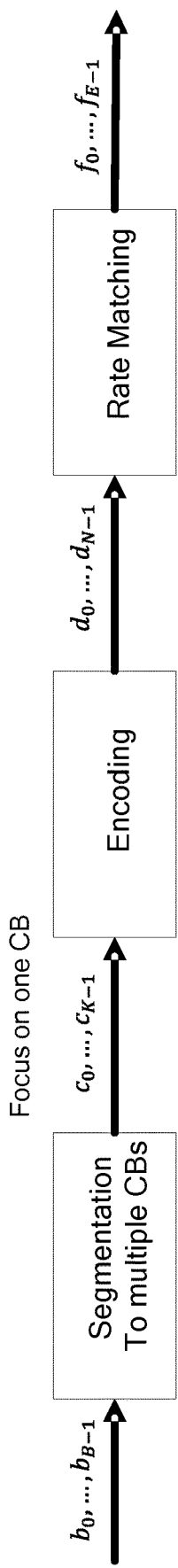
FIG. 7 is a block diagram illustrating an example encoding chain, in accordance with certain aspects of the present disclosure.

FIG. 7 is a block diagram illustrating an example encoding chain, in accordance with certain aspects of the present disclosure. As shown in FIG. 7, a transport block (TB) is segmented into one or more code blocks (CBs), for example, if the TB size is larger than a threshold. The CBs are then encoded. The coded bit sequence for the CB includes information bits and parity bits. After the encoding (and before constellation mapping), rate matching is performed on the coded bits. Each CB may be encoded and rate matched separately.

Example Multi-TRP Transmissions

Certain systems support multiple transmission reception point (multi-TRP) transmission. In a multi-TRP scenario, the same transport block and/or code block (TB/CB) with the same information bits (but can be different coded bits) is transmitted on multiple sets of resources (e.g., associated with multiple TRPs, such as two TRPs). Resources of the different resource sets may be multiplexed using spatial division multiplexing (SDM), frequency division multiplexing) (FDM), and/or time division multiplexing (TDM), and different resource sets have different TCI states (as an example, transmitted from different TRPs/Panels). As a result, the two resource sets may be associated with different TCI states.

The UE considers the transmissions on both resource sets (e.g., from both TRPs) and jointly decodes the transmissions. In some examples, the transmissions from the TRPs is at the same time (e.g., in the same slot, mini-slot, and/or in the same symbols), but across different resource blocks (RBs) and/or different layers. The number of layers and/or the modulation order from each TRP can be the same or different. In some examples, the transmissions from the TRPs can be at different times (e.g., in two consecutive mini-slots or slots). In some examples, the transmissions from the TRPs can be a combination of the above.

Figure 8:
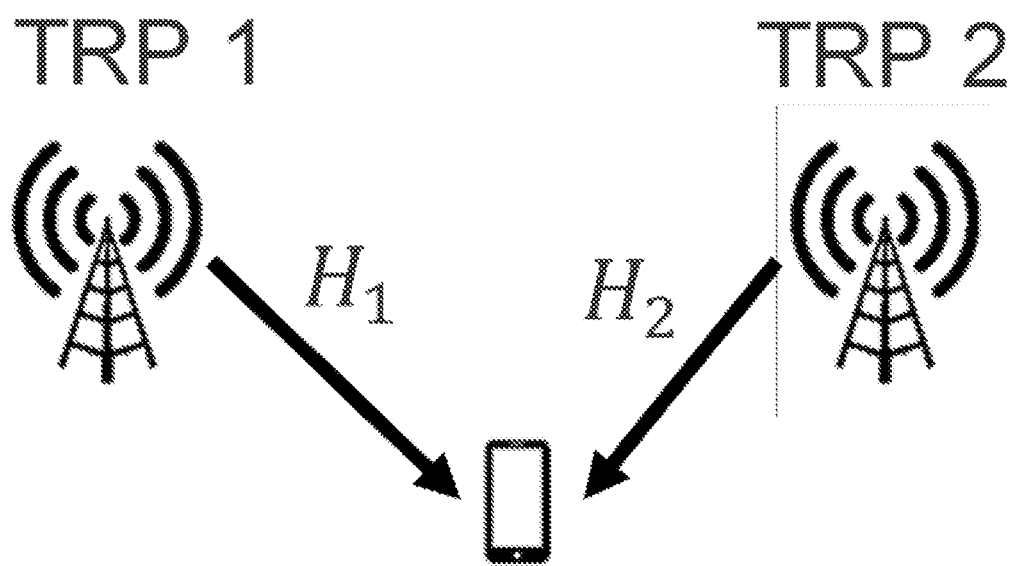
FIG. 8 is a diagram illustrating an example multiple transmission reception point (TRP) transmission scenario, in accordance with certain aspects of the present disclosure.

FIG. 8 is a diagram illustrating an example multi-TRP transmission scenario, in accordance with certain aspects of the present disclosure. As shown in FIG. 8, the UE receives a same packet/TB/CB from both TRP 1 and TRP 2 at the same time. In some examples, the TRPs transmit using disjoint resource sets. For example, TRP 1 transmit with resource set 1 and TRP 2 transmits with resource set 2.

Figure 9A:
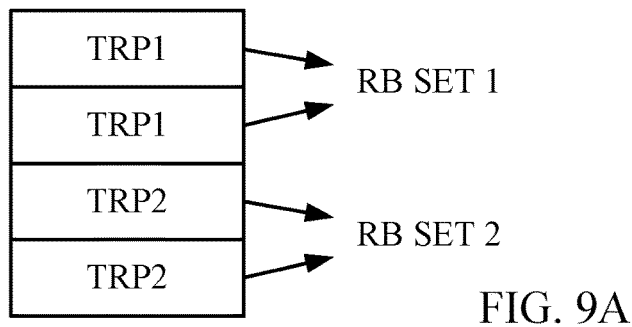
FIGS. 9A-9D illustrate example disjoint resource sets for TRPs, in accordance with certain aspects of the present disclosure.
Figure 9B:
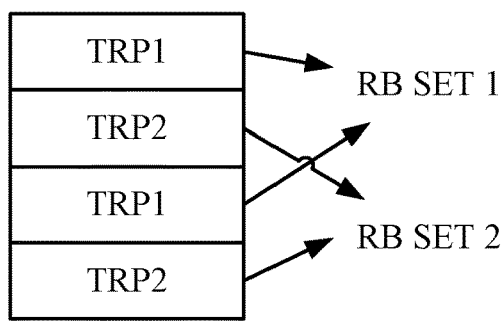
Figure 9C:
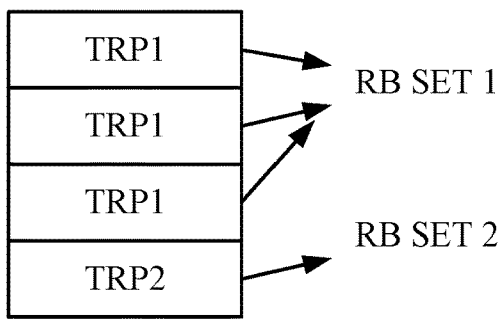
Figure 9D:
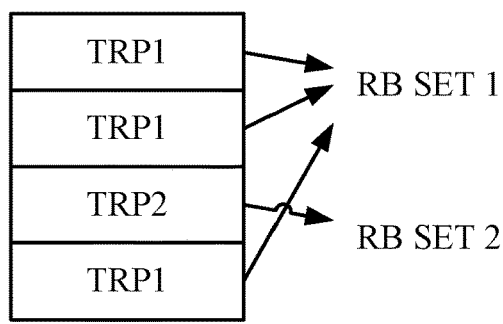

FIGS. 9A-9D illustrate example disjoint resource sets in the frequency domain (e.g., different resource block sets for multiple TRPs), in accordance with certain aspects of the present disclosure. The disjoint resources for the TRPs may be localized or distributed. FIG. 9A and FIG. 9C illustrate localized resources and FIGS. 9B and FIG. 9D illustrate distributed resources. The disjoint resources for the TRPs may have equal split or un-equal split. FIG. 9A and FIG. 9B illustrate equal split of resources and FIGS. 9C and FIG. 9D illustrate unequal split of resources. Each unit may be one RB, a resource block group (RBG), or precoding RBG (PRG). As noted above, different resource sets can be also multiplexed in the time domain or spatial domain (e.g. different spatial layers transmitted in the same RBs and OFDM symbols).

Example TBS Determination for Multi-TRP

Aspects of the present disclosure relate to wireless communications, and more particularly, to techniques for determining transport block size (TBS) for joint transmissions involving multiple resource sets, which may be associated with multiple transmission reception points (TRPs).

The techniques presented herein may be utilized for joint transmissions, where conventional techniques only address TBS determination for single resource set (TRP) transmissions.

While examples below refer to multi-TRP transmissions involving multiple TRPs, the techniques presented herein may also be applied to "multi-panel" transmissions involving multiple antenna panels of a same TRP. As described above, a joint transmission may involve multiple sets of resources that may at least partially overlap or may be disjoint. Each set of resources may be associated with (allocated to) a different TRP (or different panel of a multi-panel TRP). As described herein, transmission on each set of resources may have its own associated transmission parameters (e.g., different modulation order and/or number of layers) and/or Transmission Configuration Indicator States. TCI states are generally dynamically sent over in a DCI message which includes configurations such as quasi co-location (QCL) relationships between the DL RSs in one CSI-RS set and the PDSCH DMRS ports.

For example, according to the conventional techniques, a UE first determines a number ($N_{RE}$) of resource elements (REs) within a slot, by determining the total amount of REs allocated for PDSCH and backing out overhead, such as REs for DM-RS. The UE can then determines a number of information bits ($N_{info}$), based on $N_{RE}$, a target code rate R, modulation order $Q_m$, and number of layers v:

$$R = N_{info} / N_{RE} \cdot R \cdot Q_m \cdot v$$

The TBS can then be determined based on (as a quantized version of) $N_{info}$.

In single TRP transmissions, the rate is defined as is defined as the number of information bits divided by the number of coded bits ($N_{info}/(N_{RE} \cdot Q_m \cdot v)$). Thus, as noted above, by knowing N_RE Q_m v and R, TBS size ($N_{info}$) can be determined.

As noted above, joint transmissions of a TB may involve multiple sets of resources. For example, in the multi-TRP case, however, when two (or more) TRPs transmit the same TB (e.g., for enhanced reliability), they may transmit in the same RBs, or disjoint RBs, or partial overlapping RBs. As a result, the two TRPs may have different numbers of REs within a slot, $N_{RE,1}$ and $N_{RE,2}$. Further, transmissions from the two TRPs may use the same modulation order or different modulation orders, $Q_{m,1}$ and $Q_{m,2}$ and may use the same number of layers (rank) or different number of layers across the two TRPs, $v_1$ and $v_2$. Thus, the total number of coded bits transmitted across both TRPs is more complicated: $N_{RE,1}Q_{m,1}v_1 + N_{RE,2}Q_{m,2}v_2$.

Given the total number of coded bits in joint transmissions is a factor of transmission parameters for different sets of resources (e.g., multiple TRPs), determining a rate to use for the TBS calculation presents a challenge.

Aspects of the present disclosure provide an approach that allows a UE to determine a rate to use for TBS determination for joint (e.g., multi-TRP) transmissions.

FIG. 10 is a flow diagram showing example operations 1000 for wireless communications by a network entity, in accordance with certain aspects of the present disclosure. The operations 1000 may be performed by a transmitting entity, such as a BS 110 of FIG. 1 or TRP 208 of FIG. 2.

Operations 1000 begin, at 1002, by calculating a target code rate based on a set of transmission parameters used for joint transmission of a transport block (TB) to a user equipment (UE) involving at least first and second resource sets. At 1004, the network entity signals, via downlink control information (DCI), the target code rate to the UE for use in calculating a transport block size (TBS) for processing the joint transmission.

FIG. 11 is a flow diagram showing example operations 1100 for wireless communications by a user equipment (UE), in accordance with certain aspects of the present disclosure. Operations 1100 may be performed, for example, by a UE such as a UE 120 of FIG. 1 to determine TBS for a multi-TRP transmission (e.g., from a TRP performing operations 1000 of FIG. 10).

Operations 1100 begin, at 1102, by receiving downlink control information (DCI) signaling of a target code rate calculated based on a set of transmission parameters used for joint transmission of a transport block (TB) to a user equipment (UE) involving at least first and second resource sets. At 1104, the UE calculates a transport block size (TBS) for processing the joint transmission based on the target code rate.

Various solutions are provided for determining a rate, given a joint transmission may involve different sets of resources using different transmission parameters (and/or TCI states).

In a first solution, a rate may be defined with respect to both TRPs (or resource sets). This combined rate may be calculated as the number of information bits divided by the total number of coded bits across both TRPs:

$$R = N_{info}/(N_{RE,1}Q_{m,1}v_1 + N_{RE,2}Q_{m,2}v_2)$$

The value of R signaled in PDCCH (as part of the MCS field) may assume this definition (for a combined rate). Thus, for TBS determination, a UE may determine the number of information bits as:

$$N_{info} = (N_{RE,1}Q_{m,1}v_1 + N_{RE,2}Q_{m,2}v_2)R.$$

In a second solution, a rate may be defined with respect to a selected one of the TRPs (or resource sets). This single TRP rate may be calculated, for a selected one of the multiple TRPs, as the number of information bits divided by the number of coded bits transmitted across the selected TRP. For example, assuming TRP1 is selected, this rate may be calculated as:

$$R = N_{info}/(N_{RE,1}Q_{m,1}v_1)$$

The value of R signaled in PDCCH (as part of the MCS field) may assume this definition (for a single rate based on TRP1). Thus, for TBS determination, a UE may determine the number of information bits as:

$$N_{info} = (N_{RE,1}Q_{m,1}v_1)R.$$

This second solution is similar to treating the transmission one the second set of resources (e.g., from a second TRP TRP2) as a retransmission. In other words, TBS determination is only based on the first set or resources or TRP (or only based on the second set of resources or TRP), as it is treated as a first transmission.

For both of the options described above (combined rate or single rate), a single downlink control information (DCI) can be sent to signal all the required parameters for TBS calculation. However, only one target code rate needs to be signaled. For the case of different modulation orders ($Q_{m,1} \neq Q_{m,2}$), there are options for signaling the different modulation orders via PDCCH. According to a first option, one MCS field value may be signaled, from which the rate R and first modulation order $Q_{m,1}$ are determined, with the second modulation order $Q_{m,2}$ indicated in a separate field. According to a second option, a single MCS field may be signaled that covers two modulation orders and one coding rate (although this MCS field may require a larger number of bits than the MCS field of option 1).

As described herein, aspects of the present disclosure provide various techniques that allow a UE to determine a rate to use for TBS determination for joint transmissions involving multiple sets of resources (and possibly multiple TRPs).

Example Embodiments

Embodiment 1: A method for wireless communications by a user equipment (UE), comprising receiving downlink control information (DCI) signaling of a target code rate calculated based on a set of transmission parameters used for joint transmission of a transport block (TB) to the UE involving at least first and second resource sets and calculating a transport block size (TBS) for processing the joint transmission based on the target code rate.

Embodiment 2: The method of Embodiment 1, wherein resources of the first and second resource sets are differentiated via at least one of spatial division multiplexing (SDM), frequency division multiplexing (FDM), or time division multiplexing (TDM).

Embodiment 3: The method of any of Embodiments 1-2, wherein the first and second sets of resources are associated with first and second transmitter receiver points (TRPs) and the target code rate is calculated based on a set of transmission parameters used by at least one of the first TRP or the second TRP.

Embodiment 4: The method of any of Embodiments 1-3, wherein the first and second resource sets are associated with different TCI states.

Embodiment 5: The method of any of Embodiments 1-4, wherein the target code rate is calculated as a combined rate based on a total number of coded bits to be transmitted across both the first and second resource sets for the transmission.

Embodiment 6: The method of Embodiment 5, wherein the TBS is calculated based on a number of information bits calculated based on: the combined rate, a number of resource elements (REs) allocated for physical downlink shared channel (PDSCH) within a physical resource block (PRB) set for each of the first and second resource sets scheduled for the transmission, a modulation order for the PDSCH for each of the first and second resource sets, and a number of layers for each of the first and second resource sets.

Embodiment 7: The method of Embodiment 6, wherein the DCI comprises a modulation and coding scheme (MCS) field that indicates the target code rate and the modulation order of the first resource set and a field that also indicates the modulation order of the second resource set.

Embodiment 8: The method of any of Embodiments 1-7, wherein the DCI comprises a single modulation and coding scheme (MCS) field that indicates the target code rate, the modulation order of the first resource set, and the modulation order of the second resource set.

Embodiment 9: The method of any of Embodiments 1-8, wherein the target code rate is calculated based on a total number of coded bits to be transmitted across a selected one of the first resource set or the second resource set for the transmission.

Embodiment 10: The method of Embodiment 9, wherein the total number of coded bits to be transmitted across the selected resource set is determined based on a number of resource blocks, OFDM symbols, modulation order and number of layers for the selected resource set.

Embodiment 11: The method of Embodiment 10, wherein the DCI indicates at least one of the number of resource blocks, OFDM symbols, modulation order or number of layers for the selected resource set.

Embodiment 12: The method of any of Embodiments 1-11, wherein the TBS is calculated based on: the target code rate, a number of resource elements (REs) allocated for physical downlink shared channel (PDSCH) within a physical resource block (PRB) set for the selected resource set scheduled for the multi-TRP transmission, a modulation order for the PDSCH for the selected resource set, and a number of layers for the selected resource set.

Embodiment 13: A method for wireless communications by a first transmission reception point (TRP), comprising calculating a target code rate based on a set of transmission parameters for joint transmission of a transport block (TB) to a user equipment (UE) involving at least first and second resource sets and signaling, via downlink control information (DCI), the target code rate to the UE for use in calculating a transport block size (TBS) for processing the joint transmission.

Embodiment 14: The method of Embodiment 13, wherein resources of the first and second resource sets are differentiated via at least one of spatial division multiplexing (SDM), frequency division multiplexing (FDM), or time division multiplexing (TDM).

Embodiment 15: The method of any of Embodiments 13-14, wherein the first and second sets of resources are associated with the first TRP and a second TRP and the target code rate is calculated based on a set of transmission parameters used by at least one of the first TRP or the second TRP.

Embodiment 16: The method of any of Embodiments 13-15, wherein the first and second resource sets are associated with different TCI states.

Embodiment 17: The method of any of Embodiments 13-16, wherein the target code rate is calculated as a combined rate based on a total number of coded bits to be transmitted across both the first and second resource sets for the transmission.

Embodiment 18: The method of Embodiment 17, wherein the combined rate is calculated based on: a number of resource elements (REs) allocated for physical downlink shared channel (PDSCH) within a physical resource block (PRB) set for each of the first and second resource sets, a modulation order for the PDSCH for each of the first and second resource sets, and a number of layers for each of the first and second resource sets.

Embodiment 19: The method of Embodiment 18, wherein the DCI comprises a modulation and coding scheme (MCS) field that indicates the target code rate and the modulation order of the first resource set and a field that indicates the modulation order of the second resource set.

Embodiment 20: The method of any of Embodiments 13-19, wherein the DCI comprises a single modulation and coding scheme (MCS) field that indicates the target code rate, the modulation order of the first resource set, and the modulation order of the second resource set.

Embodiment 21: The method of any of Embodiments 13-20, wherein the target code rate is calculated based on a total number of coded bits to be transmitted across a selected one of the first resource set or the second resource set for the transmission.

Embodiment 22: The method of Embodiment 21, wherein the total number of coded bits to be transmitted across the selected resource set is determined based on a number of resource blocks, OFDM symbols, a modulation order, and number of layers for the selected resource set.

Embodiment 23: The method of Embodiments 22, wherein the DCI indicates at least one of the number of resource blocks, OFDM symbols, modulation order or number of layers for the selected resource set.

Embodiment 24: The method of any of Embodiments 13-23, wherein the target code rate is calculated based on: a number of resource elements (REs) allocated for physical downlink shared channel (PDSCH) within a physical resource block (PRB) set for the selected resource set, a modulation order for the PDSCH for the selected resource set, and a number of layers for the selected resource set.

Embodiment 25: An apparatus for wireless communications by a first transmission reception point (TRP), comprising means for calculating a target code rate based on a set of transmission parameters used by at least one of the first TRP or a second TRP for a multi-TRP transmission of a transport block (TB) to a user equipment (UE) and means for signaling, via downlink control information (DCI), the target code rate to the UE for use in calculating a transport block size (TBS) for processing the multi-TRP transmission.

Embodiment 26: An apparatus for wireless communications by a user equipment (UE), comprising means for receiving downlink control information (DCI) signaling of a target code rate calculated based on a set of transmission parameters used by at least one of a first transmission reception point (TRP) or a second TRP for a multi-TRP transmission of a transport block (TB) to a user equipment (UE) and means for calculating a transport block size (TBS) for processing the multi-TRP transmission based on the target code rate.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000 of FIG. 10 may be performed by the various processors of the base station 110 shown in FIG. 4, while operations 1100 of FIG. 11 may be performed by the various processors of the UE 120 shown in FIG. 4

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving downlink control information (DCI) signaling of a target code rate calculated based on a set of transmission parameters used for a joint transmission of a transport block (TB) to the UE involving different resource sets comprising at least first and second resource sets associated with first and second transmitter receiver points (TRPs), wherein the target code rate is calculated as a combined rate based on a total number of coded bits to be transmitted across both the first and second resource sets for the joint transmission; and
   calculating a transport block size (TBS) for processing the joint transmission based on the target code rate.

2. The method of claim 1, wherein resources of the first and second resource sets are differentiated via at least one of spatial division multiplexing (SDM), frequency division multiplexing (FDM), or time division multiplexing (TDM).

3. The method of claim 1, wherein: the target code rate is calculated based on the set of transmission parameters used by at least one of the first TRP or the second TRP.

4. The method of claim 1, wherein the first and second resource sets are associated with different TCI states.

5. The method of claim 1, wherein the TBS is calculated based on a number of information bits calculated based on:
   the combined rate;
   a number of resource elements (REs) allocated for a physical downlink shared channel (PDSCH) within a physical resource block (PRB) set for each of the first and second resource sets scheduled for the transmission;

a modulation order for the PDSCH for each of the first and second resource sets; and
a number of layers for each of the first and second resource sets.
6. The method of claim 5, wherein the DCI comprises:
a modulation and coding scheme (MCS) field that indicates the target code rate and the modulation order of the first resource set; and
a field that also indicates the modulation order of the second resource set.
7. The method of claim 5, wherein the DCI comprises a single modulation and coding scheme (MCS) field that indicates the target code rate, the modulation order of the first resource set, and the modulation order of the second resource set.
8. A method for wireless communications by a user equipment (UE), comprising:
receiving downlink control information (DCI) signaling of a target code rate calculated based on a set of transmission parameters used for a joint transmission of a transport block (TB) to the UE involving different resource sets comprising at least first and second resource sets associated with first and second transmitter receiver points (TRPs), wherein the target code rate is calculated based on a total number of coded bits to be transmitted across a selected one of the first resource set or the second resource set for the joint transmission; and
calculating a transport block size (TBS) for processing the joint transmission based on the target code rate.
9. The method of claim 8, wherein: the total number of coded bits to be transmitted across the selected resource set is determined based on a number of resource blocks, orthogonal frequency division multiplexing (OFDM) symbols, modulation order and a number of layers for the selected resource set.
10. The method of claim 9, wherein the DCI indicates at least one of the number of resource blocks, the OFDM symbols, the modulation order or the number of layers for the selected resource set.
11. The method of claim 8, wherein the TBS is calculated based on:
the target code rate;
a number of resource elements (REs) allocated for a physical downlink shared channel (PDSCH) within a physical resource block (PRB) set for the selected resource set scheduled for a multi-TRP transmission;
a modulation order for the PDSCH for the selected resource set; and
a number of layers for the selected resource set.
12. A method for wireless communications by a first transmission reception point (TRP), comprising:
calculating a target code rate based on a set of transmission parameters for a joint transmission of a transport block (TB) to a user equipment (UE) involving different resource sets comprising at least first and second resource sets associated with the first TRP and a second TRP, wherein the target code rate is calculated as a combined rate based on a total number of coded bits to be transmitted across both the first and second resource sets for the joint transmission; and
signaling, via downlink control information (DCI), the target code rate to the UE for use in calculating a transport block size (TBS) for processing the joint transmission.
13. The method of claim 12, wherein resources of the first and second resource sets are differentiated via at least one of spatial division multiplexing (SDM), frequency division multiplexing (FDM), or time division multiplexing (TDM).
14. The method of claim 12, wherein: the target code rate is calculated based on the set of transmission parameters used by at least one of the first TRP or the second TRP.
15. The method of claim 12, wherein the first and second resource sets are associated with different TCI states.
16. The method of claim 12, wherein the combined rate is calculated based on:
a number of resource elements (REs) allocated for a physical downlink shared channel (PDSCH) within a physical resource block (PRB) set for each of the first and second resource sets;
a modulation order for the PDSCH for each of the first and second resource sets; and
a number of layers for each of the first and second resource sets.
17. The method of claim 16, wherein the DCI comprises:
a modulation and coding scheme (MCS) field that indicates the target code rate and the modulation order of the first resource set; and
a field that indicates the modulation order of the second resource set.
18. The method of claim 16, wherein the DCI comprises a single modulation and coding scheme (MCS) field that indicates the target code rate, the modulation order of the first resource set, and the modulation order of the second resource set.
19. A method for wireless communications by a first transmission reception point (TRP), comprising:
calculating a target code rate based on a set of transmission parameters for a joint transmission of a transport block (TB) to a user equipment (UE) involving different resource sets comprising at least first and second resource sets associated with the first TRP and a second TRP, wherein the target code rate is calculated based on a total number of coded bits to be transmitted across a selected one of the first resource set or the second resource set for the joint transmission; and
signaling, via downlink control information (DCI), the target code rate to the UE for use in calculating a transport block size (TBS) for processing the joint transmission.
20. The method of claim 19, wherein: the total number of coded bits to be transmitted across the selected resource set is determined based on a number of resource blocks, orthogonal frequency division multiplexing (OFDM) symbols, a modulation order, and number of layers for the selected resource set.
21. The method of claim 20, wherein the DCI indicates at least one of the number of resource blocks, the OFDM symbols, the modulation order or the number of layers for the selected resource set.
22. The method of claim 19, wherein the target code rate is calculated based on:
a number of resource elements (REs) allocated for a physical downlink shared channel (PDSCH) within a physical resource block (PRB) set for the selected resource set;
a modulation order for the PDSCH for the selected resource set; and
a number of layers for the selected resource set.
23. An apparatus for wireless communications by a first transmission reception point (TRP), comprising:
means for calculating a target code rate based on a set of transmission parameters used by at least one of the first TRP or a second TRP for a multi-TRP joint transmission of a transport block (TB) to a user equipment (UE) involving different resource sets comprising at least first and second resource sets associated with the first TRP and the second TRP, wherein the target code rate is calculated as a combined rate based on a total number of coded bits to be transmitted across both the first and second resource sets for the joint transmission; and means for signaling, via downlink control information (DCI), the target code rate to the UE for use in calculating a transport block size (TBS) for processing the multi-TRP transmission.

24. An apparatus for wireless communications by a user equipment (UE), comprising:

means for receiving downlink control information (DCI) signaling of a target code rate calculated based on a set of transmission parameters used by at least one of a first transmission reception point (TRP) or a second TRP for a multi-TRP joint transmission of a transport block (TB) to a user equipment (UE) involving different resource sets comprising at least first and second resource sets associated with the first and second TRPs, wherein the target code rate is calculated as a combined rate based on a total number of coded bits to be transmitted across both the first and second resource sets for the joint transmission; and means for calculating a transport block size (TBS) for processing the multi-TRP transmission based on the target code rate.

* * * * *